United States Patent
Kelly et al.

(10) Patent No.: US 7,684,893 B2
(45) Date of Patent: Mar. 23, 2010

(54) PRODUCT SUPPORT AND DISPENSING SYSTEM FOR A VENDING MACHINE

(75) Inventors: Paul Hayward Kelly, Aiken, SC (US); Joshua Robert Powell, Aiken, SC (US); Edmund Scott Richardson, Simpsonville, SC (US); John T. Samson, Aiken, SC (US); Michael E. Stevens, Coon Rapids, MN (US)

(73) Assignee: Dixie-Narco, Inc., Williston, SC (US)

( * ) Notice: Subject to any disclaimer, the term of this patent is extended or adjusted under 35 U.S.C. 154(b) by 1798 days.

(21) Appl. No.: 10/678,190

(22) Filed: Oct. 6, 2003

(65) Prior Publication Data

US 2004/0108326 A1    Jun. 10, 2004

Related U.S. Application Data

(60) Provisional application No. 60/415,744, filed on Oct. 4, 2002, provisional application No. 60/415,747, filed on Oct. 4, 2002.

(51) Int. Cl.
*G07F 17/00* (2006.01)
*B65H 3/26* (2006.01)

(52) U.S. Cl. .................... 700/242; 221/242

(58) Field of Classification Search ............. 221/242
See application file for complete search history.

(56) References Cited

U.S. PATENT DOCUMENTS

| | | | |
|---|---|---|---|
| 1,645,236 A | | 10/1927 | Hedlind |
| 2,183,808 A | | 12/1939 | Gentry |
| 2,727,654 A | | 12/1955 | Childers et al. |
| 2,890,813 A | * | 6/1959 | Childers et al. ............... 221/67 |
| 3,104,779 A | * | 9/1963 | Denzer ........................ 221/200 |
| 3,158,289 A | | 11/1964 | Van Brunt |
| 3,165,231 A | | 1/1965 | Heiser |
| 3,356,259 A | | 12/1967 | O'Neal |
| 3,810,560 A | * | 5/1974 | Stegeman .................... 221/116 |
| 3,862,704 A | * | 1/1975 | Millies et al. ............... 221/242 |
| 4,019,650 A | | 4/1977 | Oden |
| 4,036,400 A | | 7/1977 | Oden |
| 4,354,614 A | | 10/1982 | Bookout |
| 4,354,615 A | * | 10/1982 | Lindsey ....................... 221/116 |
| 4,454,961 A | | 6/1984 | Childers et al. |
| 4,460,107 A | | 7/1984 | Lindsey |
| 4,509,658 A | | 4/1985 | Oden |
| 4,511,059 A | * | 4/1985 | Manzer ....................... 221/115 |

(Continued)

FOREIGN PATENT DOCUMENTS

JP    405342461    12/1993

*Primary Examiner*—Patrick Mackey
*Assistant Examiner*—Michael E. Butler (57) ABSTRACT

A vending machine incorporates a product support and dispensing system including an oscillator and an adjustable bail cap. The oscillator is pivotally mounted at a lower portion of one of a plurality of stack areas provided within the vending machine. The oscillator includes a product retention zone having first and second staging regions, each of which has upper and lower holding elements for retaining a product containers in pre-vend positions. The adjustable bail cap is detachably secured to the oscillator and includes an arcuate intermediate portion adapted to selectively support the product containers. The adjustable bail cap can be selectively repositioned to allow the product support and delivery system to accommodate a wide range of container sizes.

21 Claims, 12 Drawing Sheets

U.S. PATENT DOCUMENTS

| | | |
|---|---|---|
| 4,511,060 A | 4/1985 | Lindsey |
| 4,768,680 A | 9/1988 | Mehlan et al. |
| 4,940,161 A | 7/1990 | Hieb |
| 5,361,938 A | 11/1994 | Ishine |
| 5,651,476 A | 7/1997 | Percy et al. |
| 5,713,490 A * | 2/1998 | Oden et al. .................. 221/242 |
| 5,799,823 A | 9/1998 | Feltrin |
| 5,893,482 A | 4/1999 | Lang |
| 5,924,595 A | 7/1999 | Crook |
| 5,967,364 A | 10/1999 | Swanson et al. |
| 6,168,047 B1 * | 1/2001 | Takamura et al. ........... 221/303 |
| 6,302,293 B1 * | 10/2001 | Wittern et al. ................. 221/92 |
| 6,321,936 B1 | 11/2001 | Feltrin |
| 6,390,328 B1 | 5/2002 | Obermeier et al. |
| 6,431,398 B1 * | 8/2002 | Cook et al. .................. 221/124 |
| 6,561,380 B1 * | 5/2003 | Suzuki ........................ 221/266 |

* cited by examiner

PRODUCT SUPPORT AND DISPENSING SYSTEM FOR A VENDING MACHINE

CROSS-REFERENCE TO RELATED APPLICATIONS

The present application claims benefit of both U.S. Provisional Patent Application Serial No. 60/415,744 entitled "VENDING MACHINE OSCILLATOR DISPENSING SYSTEM" filed on Oct. 4, 2002 and U.S. Provisional Patent Application Ser. No. 60/415,747 entitled "VENDING MACHINE WITH OSCILLATOR DISPENSING SYSTEM INCORPORATING BAIL CAP" filed on Oct. 4, 2002.

BACKGROUND OF THE INVENTION

1. Field of the Invention

The present invention pertains to the art of vending machines and, more particularly, to an oscillator-type dispensing system for a vending machine.

2. Discussion of the Prior Art

Vending machines are commonly utilized in dispensing a wide range of products, including canned and bottled beverages, edible food items, and other consumer products. In the case of dispensing beverage products, it is desirable to configure a vending machine such that it is capable of dispensing various different sized and configured beverage containers. That is, as manufacturers of beverage products alter their container designs, it is desirable to not require the vending machine itself to be reconfigured, at least substantially, to accommodate a new product. Of course, the reliability of the overall dispensing system of the vending machine must be maintained.

For use in connection with dispensing canned and bottled beverage products, there is typically employed either a vend rotor or oscillator which is driven by a vend motor to sequentially dispense the beverage containers. In the case of the rotor, this arrangement generally takes the form of a cradle which initially receives one or more of the beverage products to be dispensed. Such cradles are typically semi-cylindrical in shape and mounted for rotation about a fore-to-aft extending axis under a column or stack of stored products. As the cradle rotates, the product(s) carried therein is dispensed. Typically, the cradle will be compartmentalized such that two or more fore-to-aft spaced products can be supported at any given time, with each product being sequentially dropped from the cradle as the cradle oscillates back and forth, whereupon the cradle receives one or more additional products for dispensing. Known oscillator-type dispensing arrangements work on a generally similar principal, except that the corresponding product support or retention structure is driven to oscillate back and forth through a predetermined angle for dispensing sequential containers from a stack.

Therefore, in connection with these conventional can and bottle vending machines, motors are employed to establish the required rotation or oscillation which, in turn, functions to release stored products from within a storage rack. Whether the motor is coupled to a rotating (rotor) or oscillating (oscillator or bail) vending device, the overall system design must be configured to accommodate the particular product parameters. To this end, vendors typically employ a variety of shims, bottle rods, rod sleeves or the like to adjust the vending geometry as needed. Obviously, requiring these additional components to provide vending flexibility is undesirable, costly to manufacture, and increases overall assembly time. One particular concern with respect to oscillating type dispensing systems is the retention characteristics, particularly when a single oscillator can be used in connection with various different products. To this end, problems of product crushing, lifting and/or pinching can develop which, in turn, can cause motor or product jams, stack or column wall bowing, and the like problems. In general, known prior art arrangements of this type exhibit two dimensional product retention.

Based on the above, there exists a need in the art for an improved product delivery system for a vending machine which is designed to flexibly accommodate future package configurations, such as the length and/or diameter of various beverage containers, without requiring an undue number of components, while exhibiting controlled and reliable vending. Therefore, there exists a need to enhance the versatility of a vending machine dispensing assembly.

SUMMARY OF THE INVENTION

The present invention is directed to use of a stepped oscillator arrangement in an overall dispensing system in a vending machine. One aspect of the invention is to provide a dispensing oscillator for a vending machine which exhibits enhanced product retention. In accordance with a preferred embodiment of the invention, at least one step is formed in the oscillator in a manner which creates retention in three dimensions. This additional retention dimension, in combination with notches provided on the oscillator, enables 4-deep can vending. In addition, the retention feature further enables a singly designed vending machine to be used in dispensing a multitude of different products with requiring complex changeovers or additional parts.

In further accordance with the invention, the stepped oscillator is designed to reduce the effective drop height for the dispensed products. More specifically, in a single step configuration, the step is configured to follow a slope of a product chute associated with the vending machine. In this manner, the dispensed product generally rides along the chute when dispensed. This arrangement functions to reduce agitation of the contents, thereby minimizing the possibility of the product spewing out of the container upon opening.

In still further accordance with the overall invention, a bail cap is detachably mounted to the oscillator in an overall dispensing system of the vending machine. In general, the bail cap operates in conjunction with the product oscillator to define part of an overall dispensing system of a vending machine. The bail cap is supported for minimal rotation relative to the oscillator which, in turn, is adapted to be driven by a vend motor in connection with dispensing products. In accordance with a preferred form of the invention, the bail cap system is adjustable so as to accommodate various sized product containers. The bail cap includes an adjustable slide member which is interposed between the bail cap itself and a portion of the oscillator. The adjustable slide member is used to select a desired degree of relative angular position between the oscillator and the bail cap.

The bail cap arrangement of the invention provides various advantages in connection with a vending machine oscillator. First, the bail cap functions to stage and isolate products in a ready-to-vend state from the stored product. This separation function eliminates excessive force of aggregate stored product directly on the oscillator. In this manner, the actual vending area is more controllable and reliability is increased.

In addition, the inclusion of the bail cap eliminates the lifting of stored product by the oscillator. That is, the bail cap maintains the next-to-load product supply in an optimum position for loading such that, when the products carried by the oscillator are all dispensed, the next-to-load products are not actually lifted prior to being seated on the oscillator. This advantageous feature substantially eliminates the potential for product crushing, avoids product lifting requirements, and prevents undo product pinching. All of these features contribute to prevent unnecessary motor or product jamming, as well as column wall bowing in the product stack.

By controlling the relative angular position between the oscillator and the bail cap, the overall product flexibility of the dispensing system is enhanced. More specifically, shifting of the adjustment slide alters the oscillating travel arc. This adjustability particularly increases the ability of the oscillator to accommodate varying diameter packages. In accordance with the most preferred embodiment of the invention, a manually adjusted slide mechanism is utilized for this purpose. The slide mechanism acts to interconnect the oscillator and the bail arm, while defining stop structure adapted to abut the oscillator to limit the permissible travel arc. In the most preferred form of the invention, the slide mechanism can be arranged in one of two alternative positions, although it is envisioned that further positions could be made available. As an alternative arrangement, the bail cap itself could be reversed end-to-end to establish the different stop positions.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
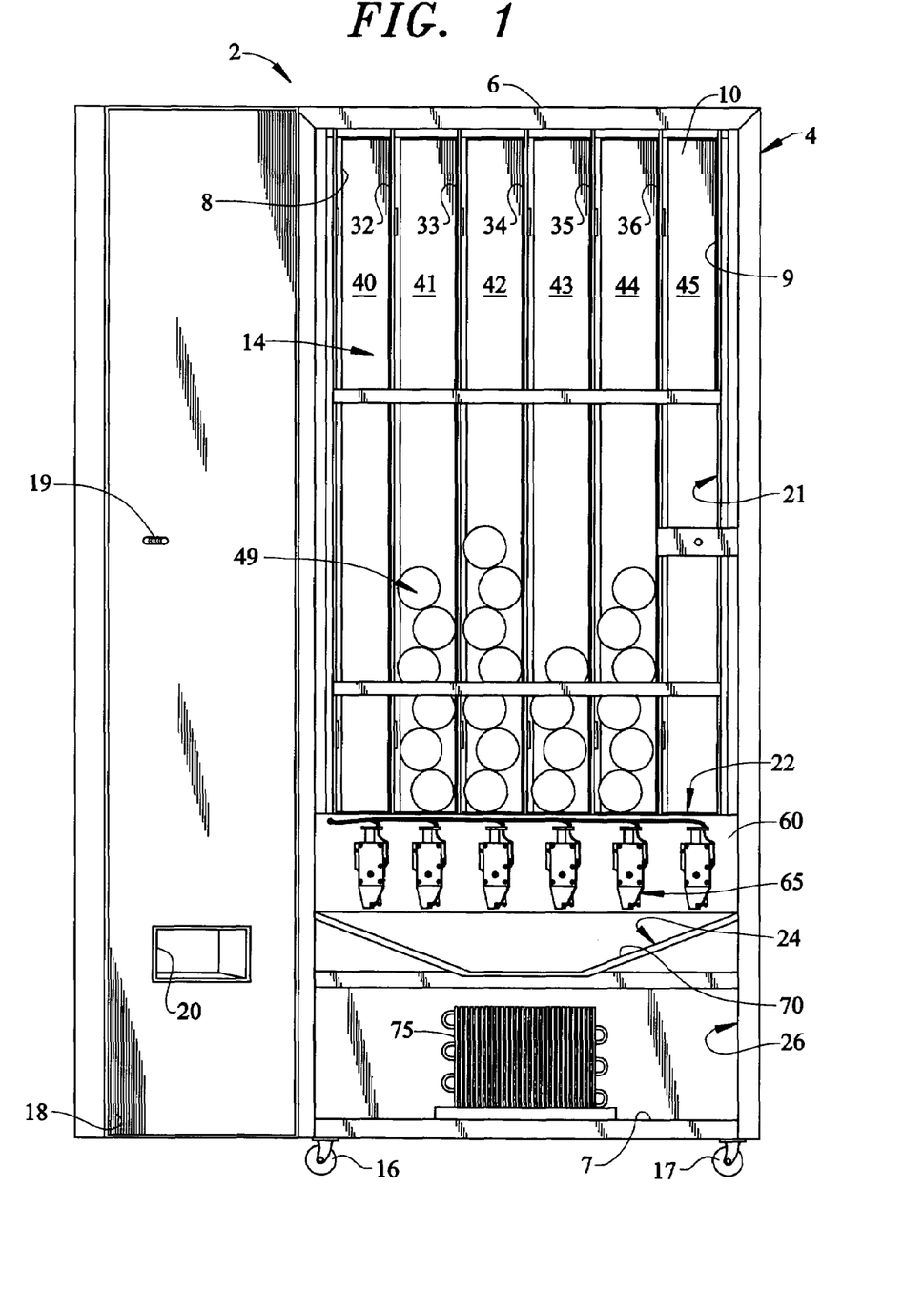
FIG. 1 is a front elevational view of a vending machine including a product support and dispensing system constructed in accordance with the present invention.

With initial reference to FIG. 1, a vending machine 2 includes a cabinet frame 4 having top, bottom, side and rear walls 6-10 that collectively define a central cavity 14. In a manner known in the art, a first pair of wheels or casters 16 and 17 are secured to a front edge portion of bottom wall 7 to facilitate the positioning of vending machine 2. Of course it should be realized that a second pair of wheels (not shown) are also arranged on a rear portion of bottom wall 7. A door 18 is pivotally mounted to cabinet frame 4 to selectively enable access to central cavity 14 in order to load various product containers or other commodities into vending machine 2. Door 18 is provided with a locking mechanism, shown in the form of a threaded rod 19, to retain door 18 in a closed position so as to prevent pilfering of the commodities from central cavity 14. Door 18 is also provided with an opening 20 to enable a consumer to remove a vended product container or other commodity from vending machine 2.

Central cavity 14 includes a storage section 21, a dispensing section 22, a delivery section 24 and a lower section 26. Storage section 21 is provided to hold products in escrow until a vending operation is performed. Towards that end, storage section 21 is provided with a plurality of vertically extending column walls 32-36 which, together with side walls 8 and 9, form a plurality of column or stack areas 40-45. In the embodiment shown in FIG. 1, stack areas 40-45 constitute single stack columns. However, it should be understood that the present invention also encompasses vending machines having multi-stack columns. In any event, stack areas 40-45 are partitioned by walls 32-36 to contain, separate and support a plurality of generally cylindrical containers 49 which, in the embodiment shown, constitute soda cans.

As further shown in FIG. 1, dispensing section 22 is provided with a frontal support wall or plate 60 having arranged thereon a plurality of vend motors, one of which is indicated at 65. As will be discussed more fully below, a plurality of cradles (not shown) are arranged behind frontal support wall 60. Actually, each column or stack area 40-45 is provided with an associated cradle (not shown) that is operated through a respective one of the plurality of vend motors 65. Upon selection of a particular product container 49 or other commodity, one of the plurality of vend motors 65 is activated to rotate a respective cradle causing a product container 49, corresponding to the selected product to emerge from vending machine 2. That is, product container 49 is transported to a product delivery chute 70 provided in delivery section 24 which is exposed to opening 20 in door 18. In order to maintain containers 49 in a refrigerated state, lower section 26 is provided with a cooling system 75. In general, the above description is provided for the sake of completeness and to enable a better understanding of the invention. The present invention is particularly directed to a product support and dispensing system that selectively transports product containers 49 from respective ones of stack areas 40-45 to product delivery chute 70.

Figure 2:
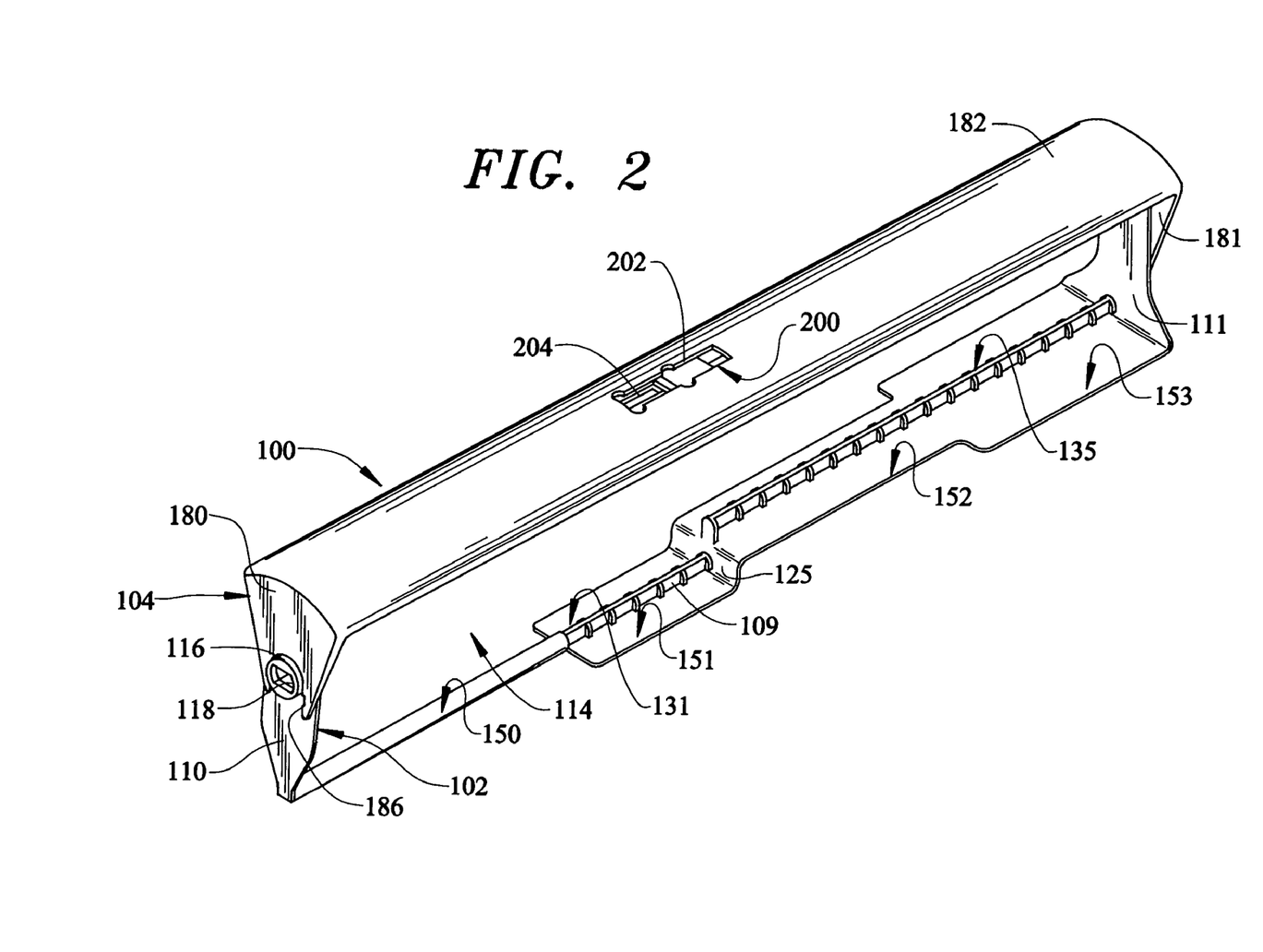
FIG. 2 is a perspective view of an overall product support and dispensing system which is constructed in accordance with a first embodiment of the invention and used in connection with dispensing products from a vending machine.
Figure 3:
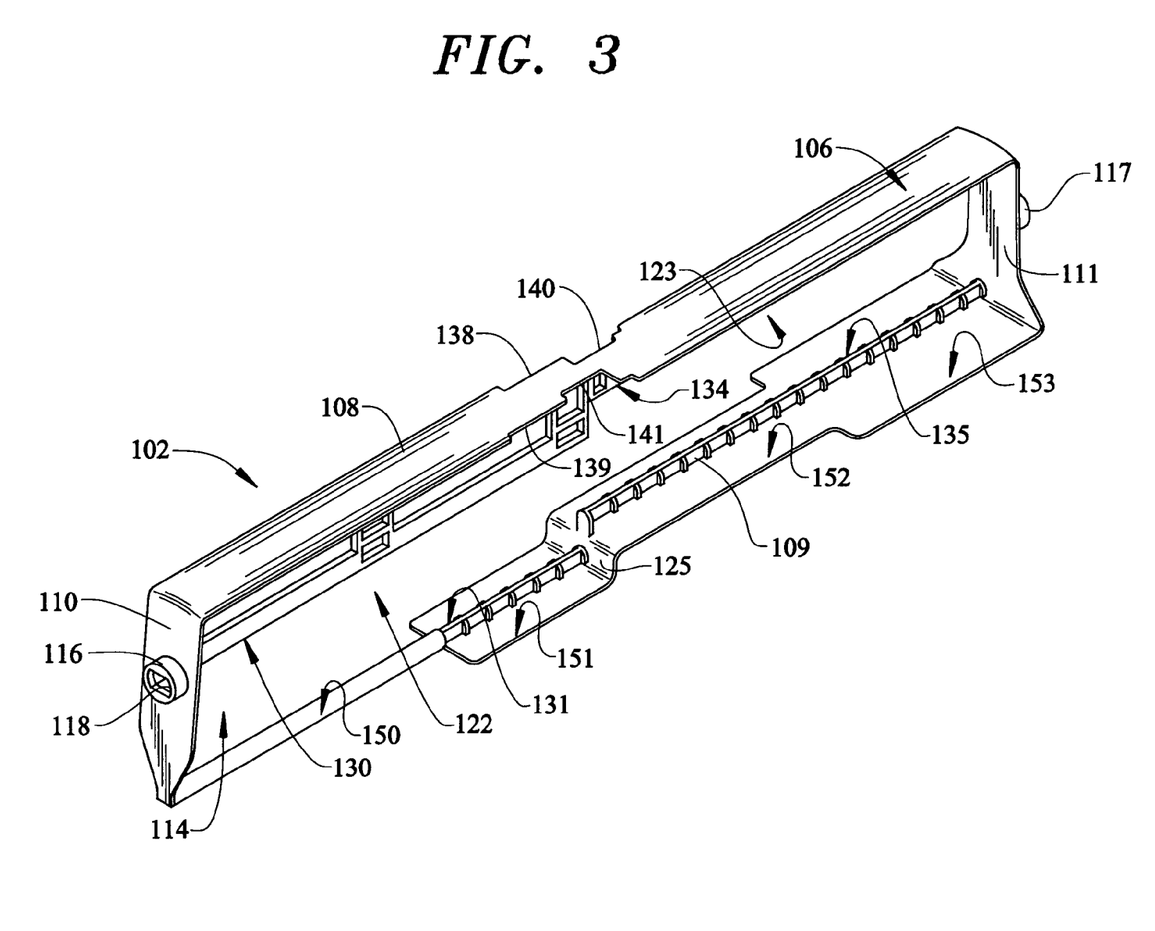
FIG. 3 is a perspective view of a stepped and notched oscillator constructed in accordance with the present invention.
Figure 4:
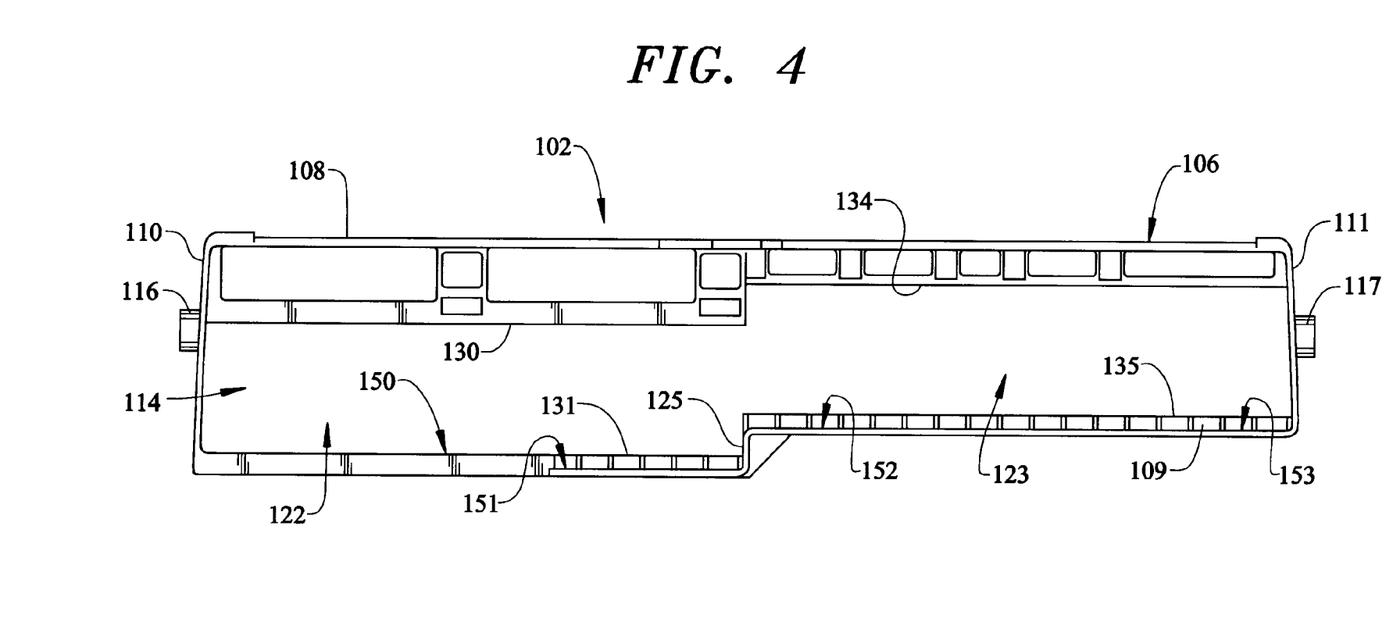
FIG. 4 is a side elevational view of the stepped oscillator of FIG. 3.

Referring to FIGS. 2-4, the product support and dispensing system of the invention is generally indicated at 100. As shown, product support and delivery system 100 includes an oscillator 102 and an adjustable bail cap 104. In accordance with a preferred embodiment of the present invention, oscillator 102 includes an outer peripheral frame 106 having top, bottom and opposing end plates 108-111 that collectively define a central product retention zone 114. Each end plate 110, 111 is provided with an axially aligned trunion or stub shaft 116, 117 that defines a pivotal axis of rotation for oscillator 102. Preferably, trunion 116 is provided with an opening 118 that receives an output shaft (not separately labeled) of a respective vend motor 65, while trunion 117 is journaled to rear wall 10.

As best seen in FIGS. 3 and 4, product retention zone 114 is divided into first and second staging regions 122 and 123. First and second staging regions 122 and 123 are actually offset one from the other through a step portion 125. Staging regions 122 and 123 are provided to retain, in a pre-vend condition, product containers 49. Toward that end, first staging region 122 is provided with upper and lower, spaced holding elements 130 and 131 that enable oscillator 102 to accommodate various size product containers. Likewise, second staging region 123 is provided with upper and lower, spaced holding elements 134 and 135 that are similarly arranged so as to retain a respective product container 49.

In accordance with the embodiment shown, each of staging regions 122 and 123 is adapted to retain or support two 12 ounce (355 mL) beverage cans or, in the alternative, one 16, 20 or 24 ounce (approximately 473, 591 or 710 mL) beverage bottle. As best seen in FIG. 3, top plate 108 has formed therein a plurality of notches 138-141 which, as will be discussed more fully below, cooperate with adjustable bail cap 104 to provide product support and delivery system 100 with the flexibility to accommodate an even wider array of product container sizes. Bottom plate 109 is provided with a plurality of terraced lands 150-153 which constitute lower supporting surfaces for the product containers. As will be discussed more fully below, the terracing of lands 150-153 enables oscillator 102 to selectively release product containers one at a time by rotating through various vend angles.

Figure 5:
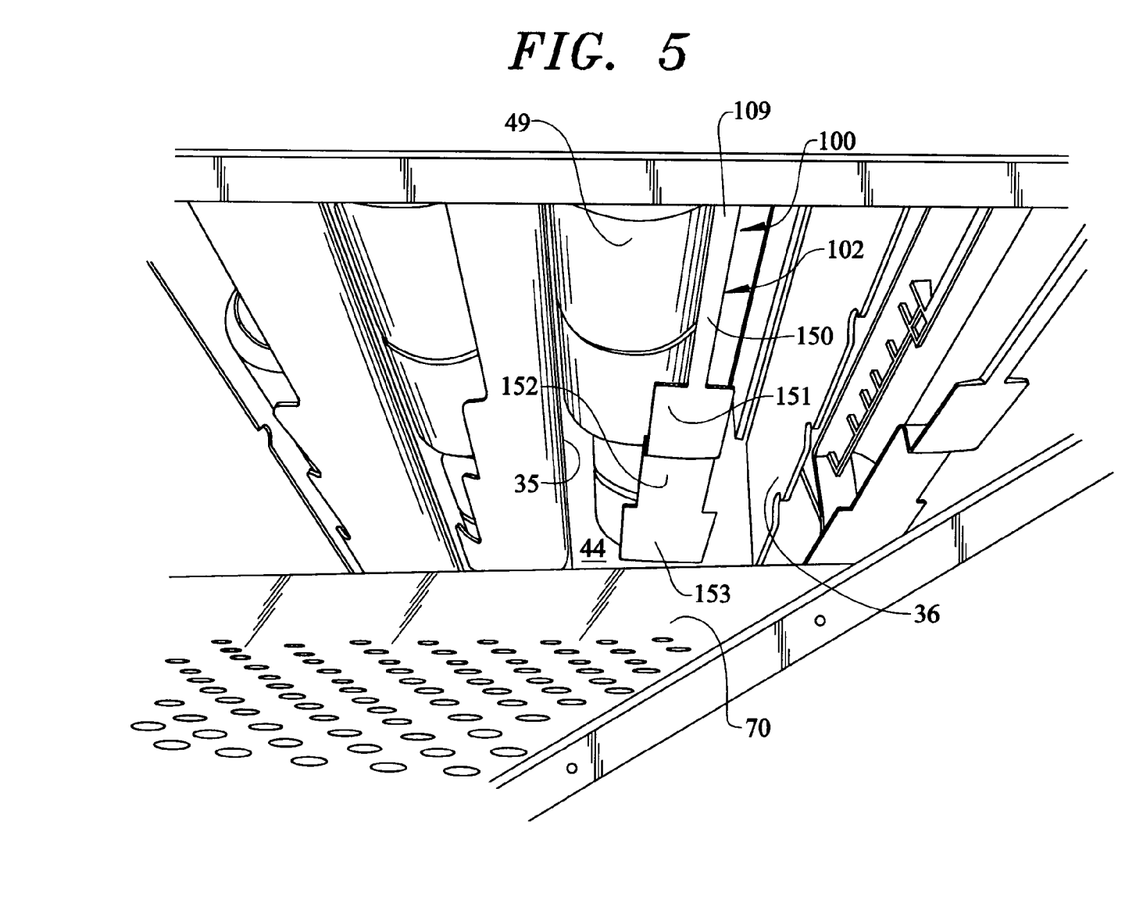
FIG. 5 is a lower perspective view into the vending machine of FIG. 1 showing a 4-deep can support and dispensing arrangement employing the stepped oscillator of the invention.
Figure 6:
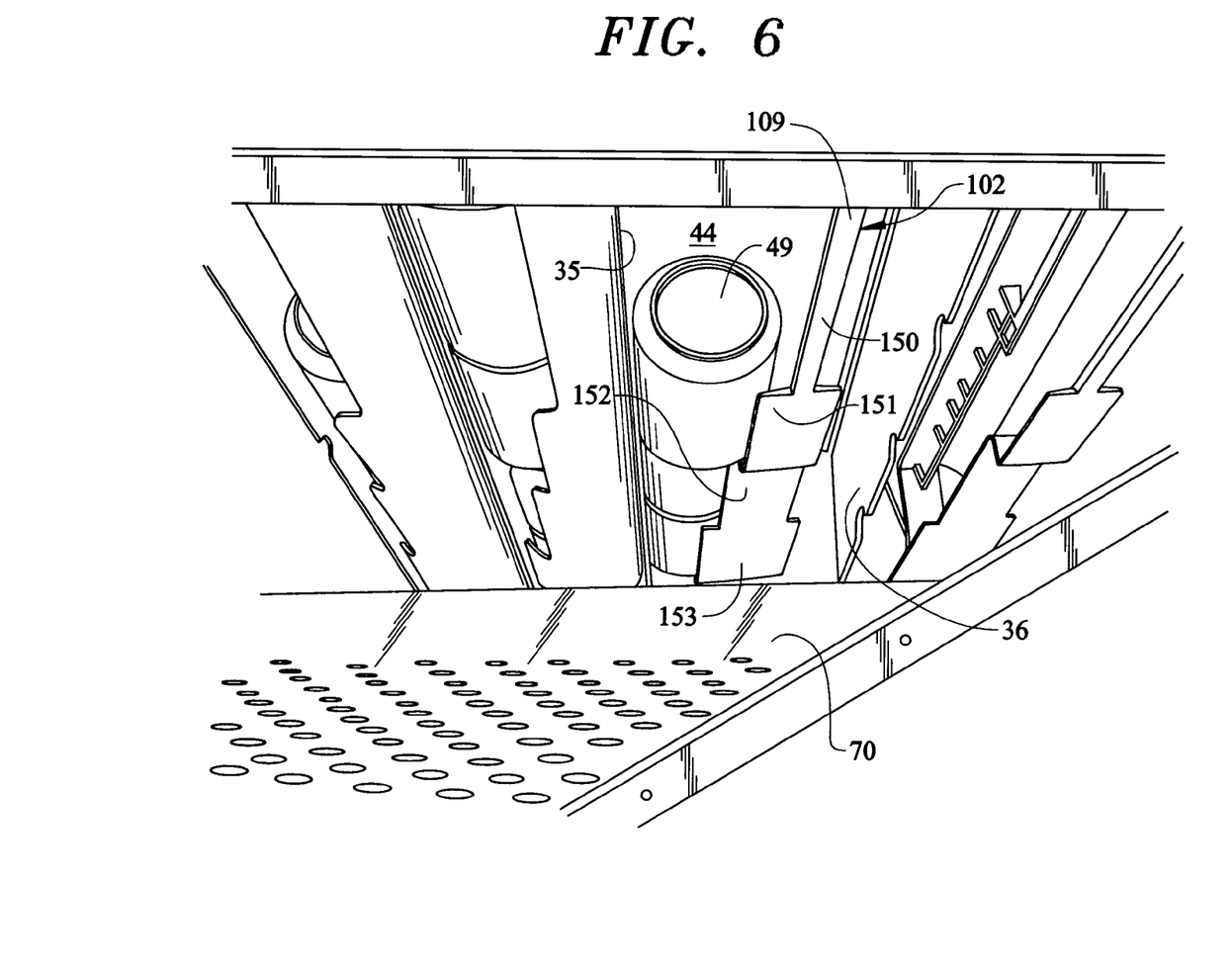
FIG. 6 is a lower perspective view, similar to that of FIG. 5, but depicting the stepped oscillator in a position wherein one of the products has been dispensed.
Figure 7:
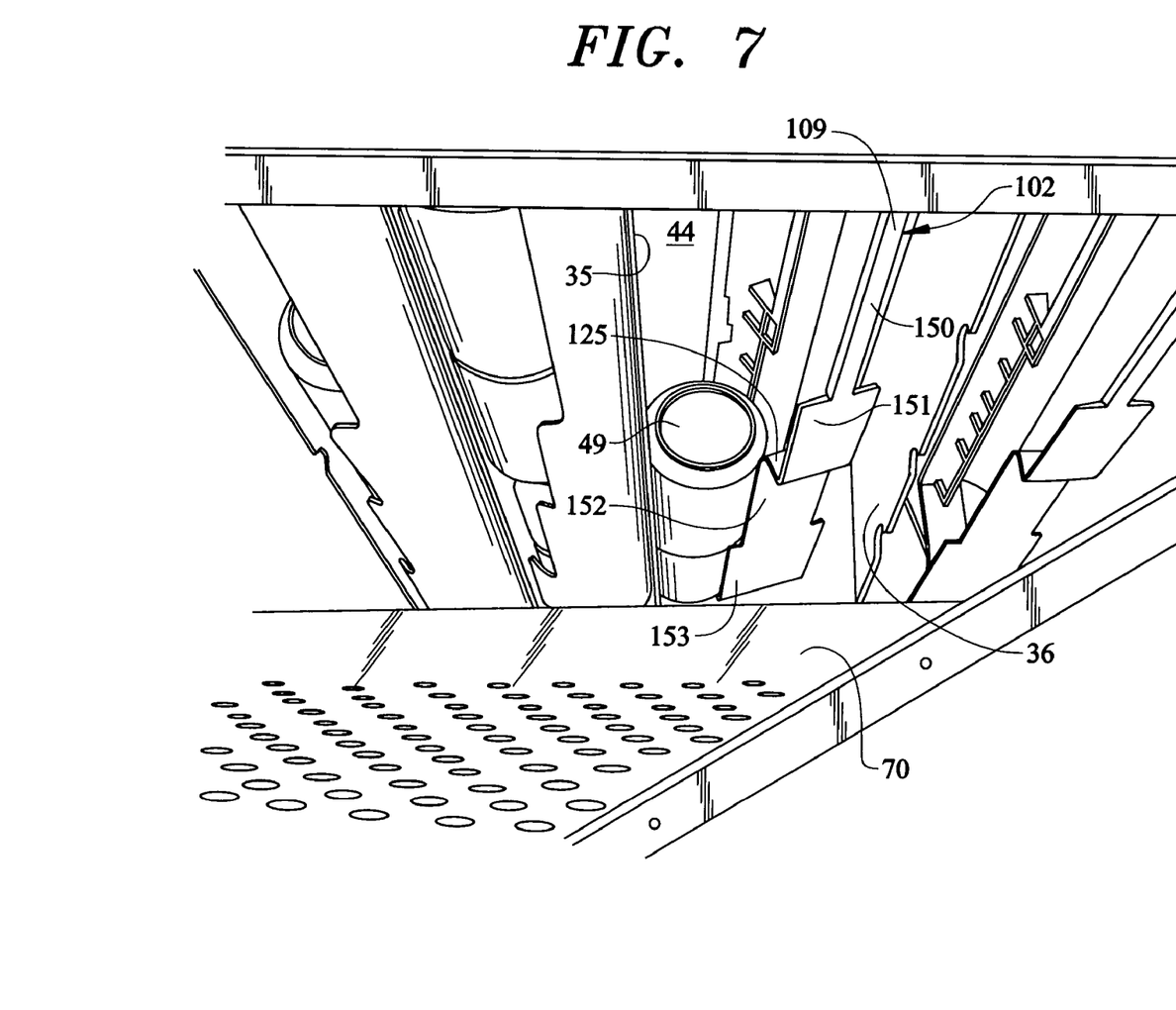
FIG. 7 is a lower perspective view, similar to that of FIG. 6, but depicting the stepped oscillator in a position wherein another one of the products has been dispensed.
Figure 8:
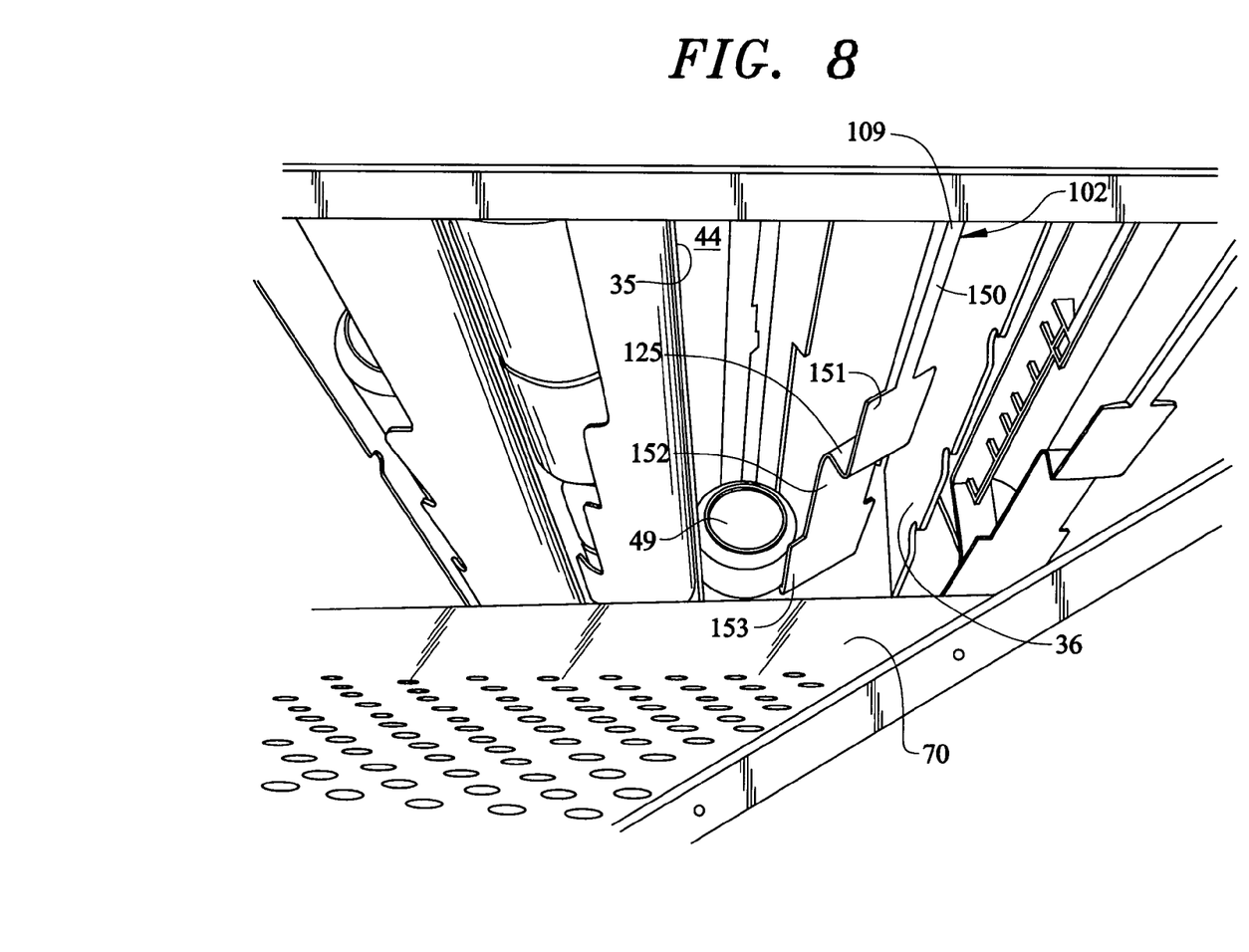
FIG. 8 is a lower perspective view, similar to that of FIG. 7, but depicting the stepped oscillator in a position wherein the final one of the products is about to be dispensed and a new set of products loaded thereon.

The manner in which product containers 49 are dispensed from vending machine 2 through product support and delivery system 100 will now be described with particular reference to FIGS. 5-8. Prior to commencing a vend cycle, product support and delivery system 100 is fully loaded with product containers 49. That is, as represented in FIG. 5, each of first and second staging regions 122 and 123 is loaded with two, three or four product containers 49 shown in the form of soda cans. When a coin or other currency is deposited in a suitable control mechanism, vend motor 65 is actuated to rotate oscillator 102 counterclockwise about a horizontal axis to the position shown in FIG. 6 wherein the foremost product container 49 has been passed into delivery chute 70. Each subsequent selection of a product container 49 will cause oscillator 102 to continue rotating counterclockwise allowing subsequent product containers 49 to pass into product delivery chute 70 as represented in FIGS. 7-8. Once the final product container 49 passes from product support and delivery system 100, vend motor 65 swings oscillator 102 clockwise causing bail cap 104 to be positioned so as to enable four additional product containers 49 to fall into and be supported by oscillator 102. At this point, oscillator 102 is then rotated back to the position shown in FIG. 5 to await further selection of product containers 49 from that particular stack area 40-45.

Figure 9:
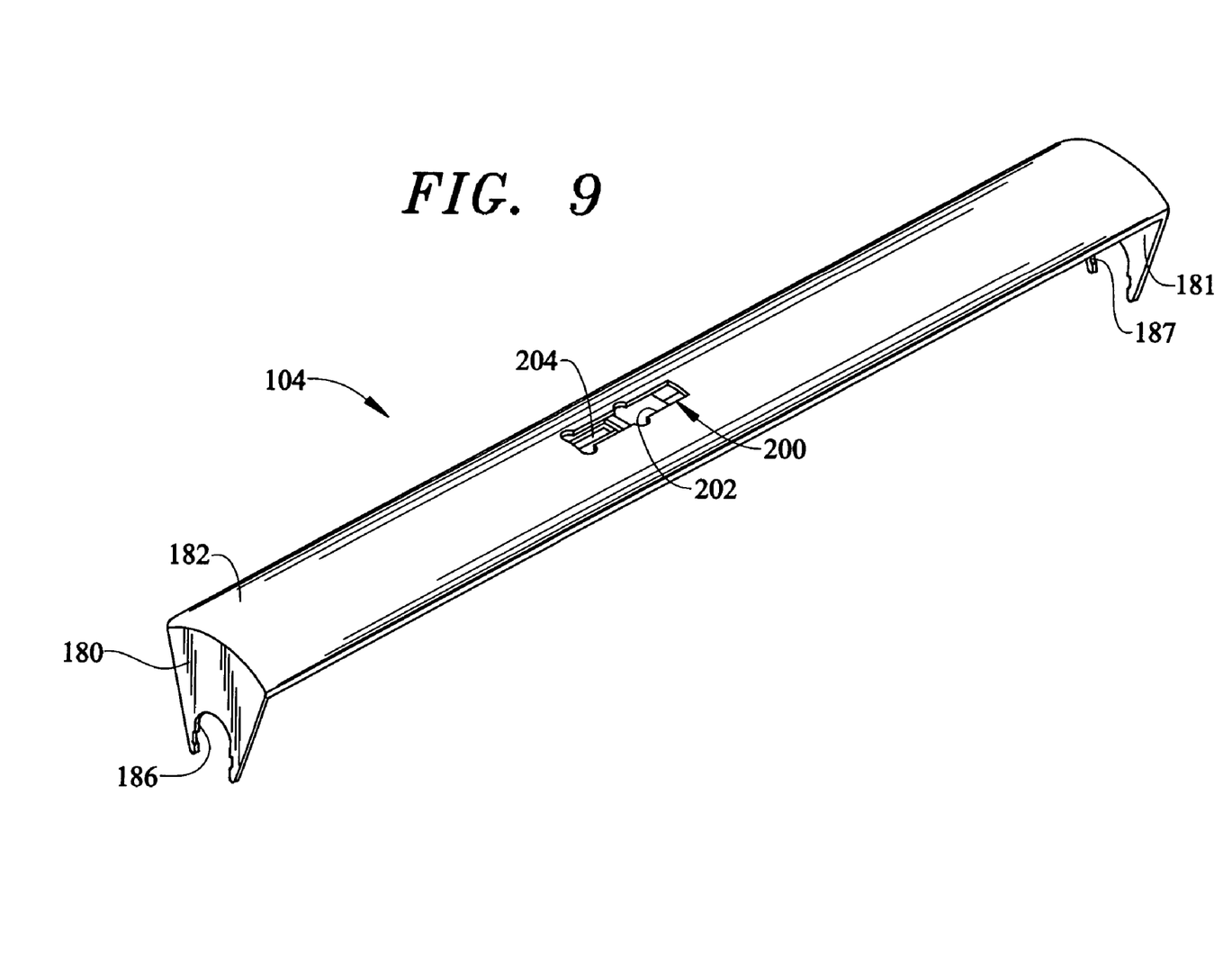
FIG. 9 is an upper perspective view of a bail cap constructed in accordance with one embodiment of the present invention.
Figure 10:
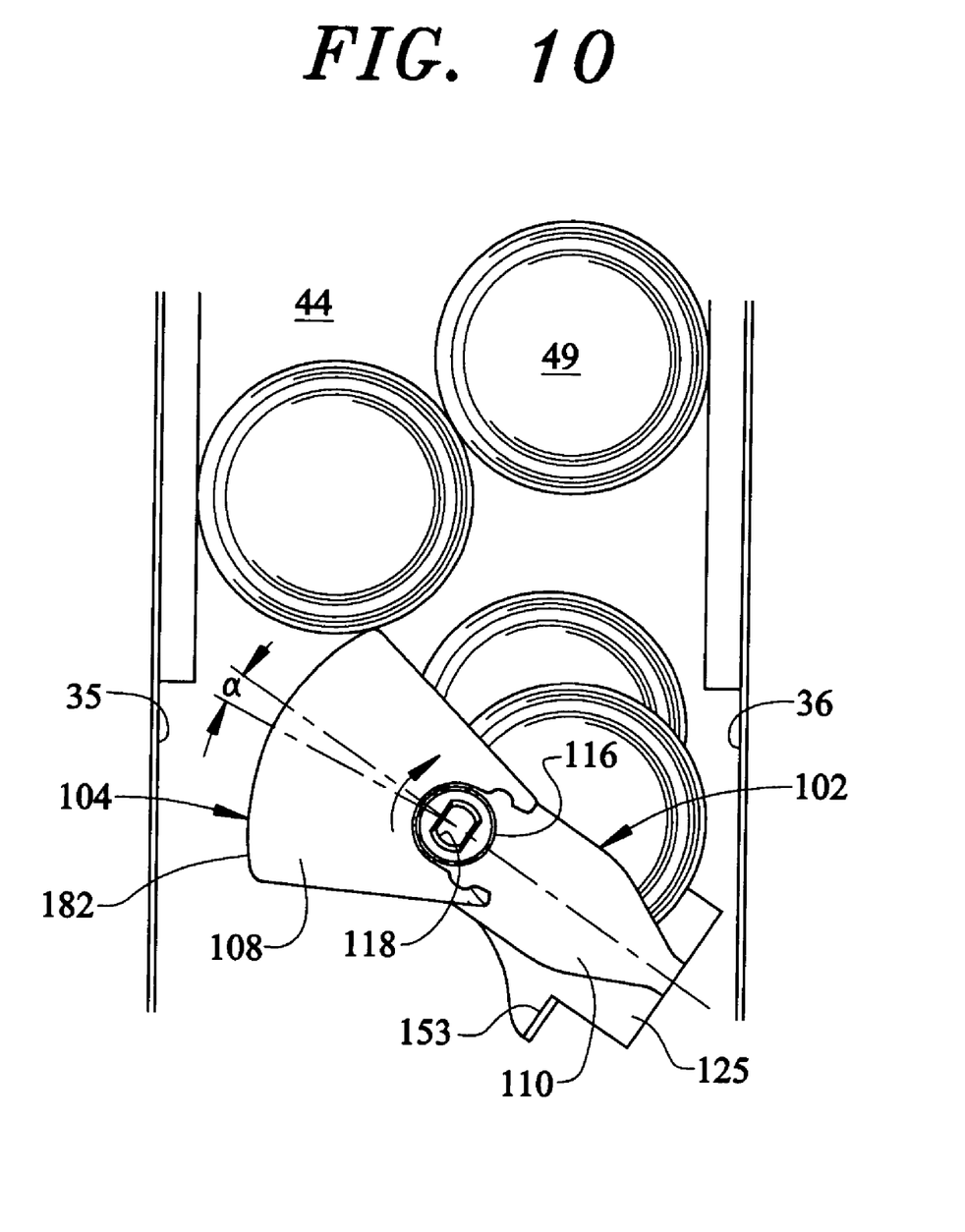
FIG. 10 is a front plan view illustrating the interaction of the oscillator and bail cap with vending and stored products.
Figure 11:
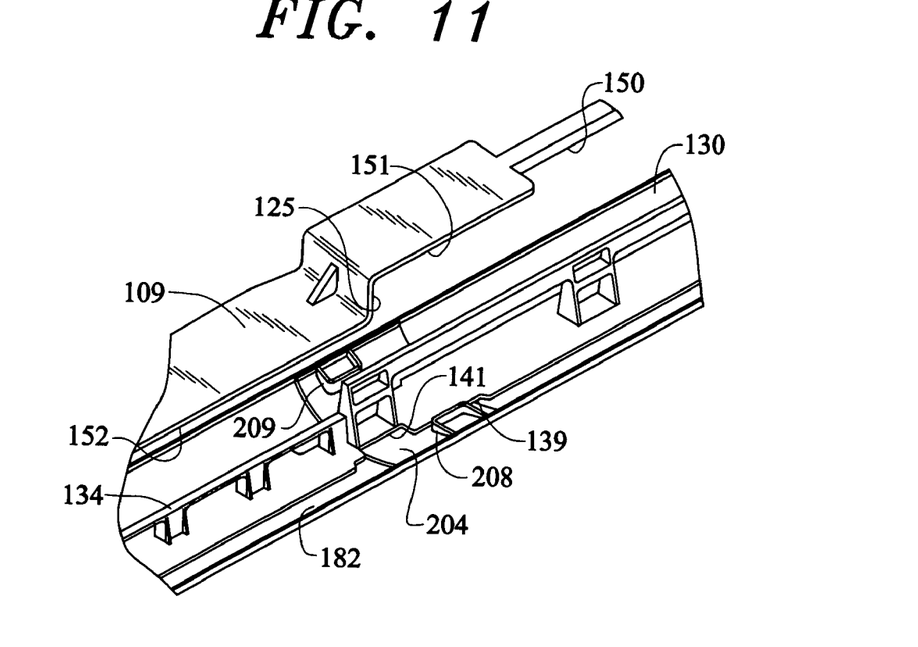
FIG. 11 is a perspective view of a portion of the combination oscillator and bail cap shown inverted to depict a sliding adjustment mechanism constructed in accordance with an embodiment of the present invention in a first adjustment position.
Figure 12:
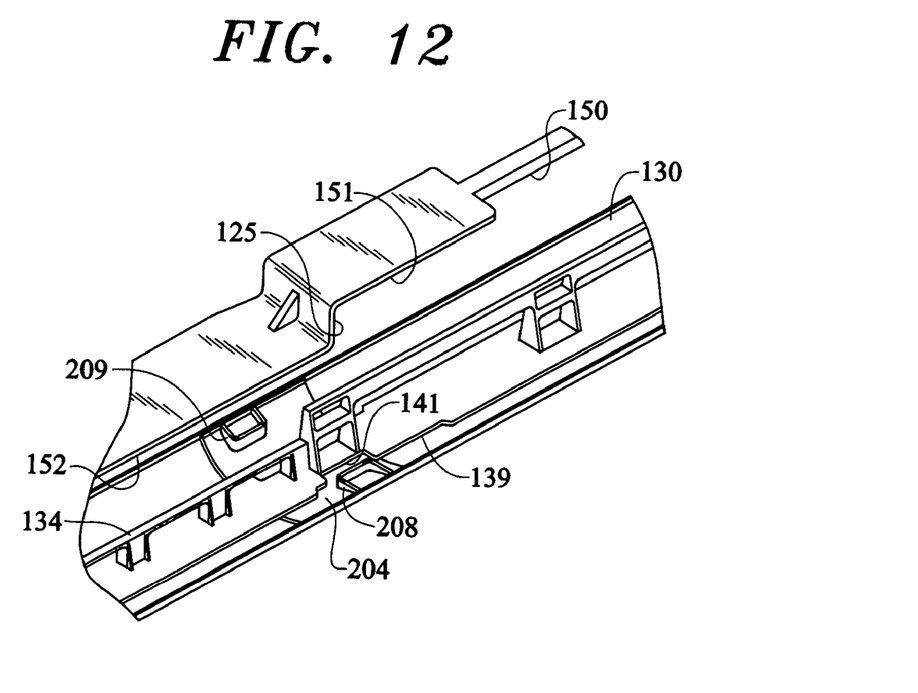
FIG. 12 is a perspective view, similar to that of FIG. 11, but illustrating the sliding adjustment mechanism in a second adjustment position.

As best shown in FIG. 9, adjustable bail cap 104 includes first and second end portions 180 and 181 that are interconnected through an arcuate intermediate portion 182. Arcuate intermediate portion 182 particularly enables product support and delivery system 100 to make a smooth transition as oscillator 102 rotates through the various vend angles. As best illustrated in FIG. 10, adjustable bail cap 104 actually rotates under product containers 49 so as to not harm or damage or create any substantial resistance to the rotation of product support and delivery system 100. In any event, again with reference to FIG. 9, first and second end portions 180 and 181 are provided with respective notches 186 and 187 that enable bail cap 104 to snap-fittingly engage onto trunions 116 and 117 of oscillator 102.

Figure 13:
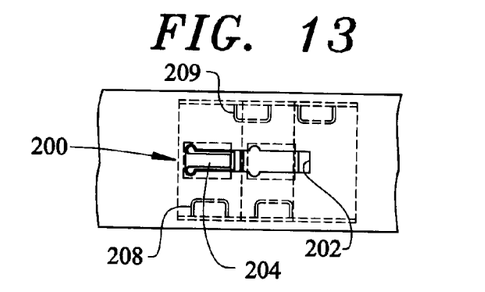
FIG. 13 is a top view of a portion of the bail cap illustrating the position of locating or retainer structure provided as part of the adjustment mechanism.

In accordance with the most preferred form of the present invention best shown in FIGS. 9 and 11-13, adjustable bail cap 104 includes an adjustment mechanism, generally indicated at 200, arranged within a slotted opening 202 of arcuate intermediate portion 182. Adjustment mechanism 200 includes a slider 204 having a pair of opposing end stops 208 and 209 adapted to engage into respective notches 138-141 on top plate 108. Therefore, slider 204 can be shifted longitudinally within slotted opening 202, i.e., left to right as shown in FIG. 13, such that end stops 208 or 209 engage with respective notches 138-141 to set a particular angular position of adjustable bail cap 104 with respect to oscillator 102. In accordance with the embodiment shown in these Figures, end stop 208 will engage with either notches 139 or 141 to select between first and second angular positions for adjustable bail cap 104. With this particular arrangement, various sized, i.e., diameter, product containers can be accommodated by product support and delivery system 100.

Figure 14:
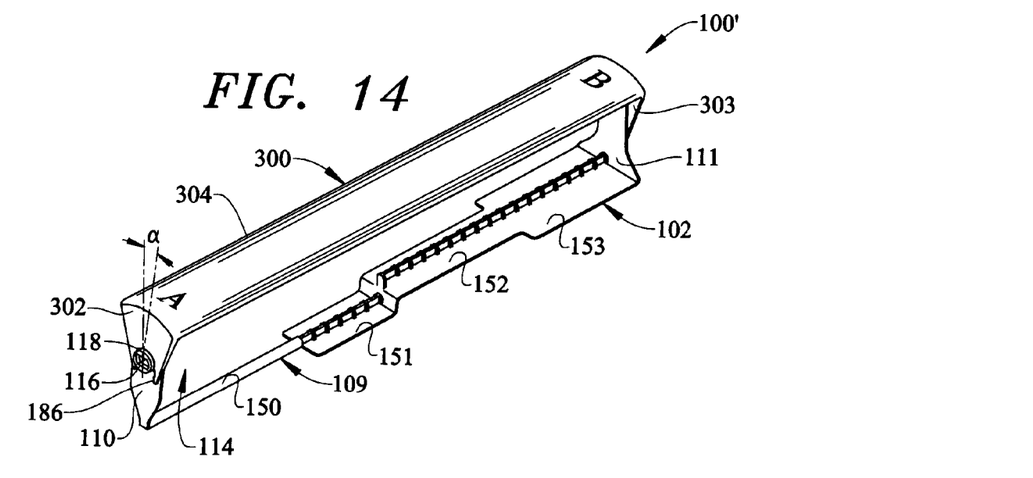
FIG. 14 is a perspective view of a combination oscillator and bail cap assembly constructed in accordance with another embodiment of the invention and depicting the bail cap in a position for dispensing small products.
Figure 15:
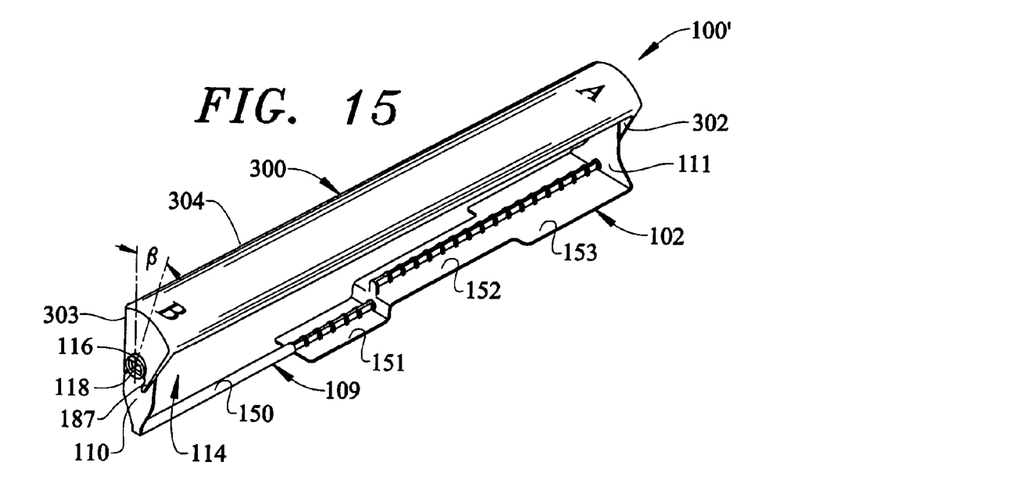
FIG. 15 is a perspective view, similar to that of FIG. 14, but depicting the oscillator and bail cap assembly reversed end-to-end in order to establish a position for dispensing larger products.

In accordance with another embodiment of the present invention illustrated in FIGS. 14 and 15, a product support and delivery system 100' is shown to include an adjustable bail cap 300 having first and second end portions 302 and 303 that are interconnected through an arcuate intermediate portion 304. End portions 302 and 303 are positioned such that notches 186 and 187 are relatively offset from a centerline of arcuate intermediate portion 304. In this embodiment, the angular position of bail cap 300 with respect to oscillator 102 is set or determined by the particular placement of bail cap 104 on oscillator 102. That is, in order to accommodate containers of a first size, bail cap 104 is positioned such that a side A corresponding to first end portion 302 is aligned or connected to trunion 118 on end plate 110 to establish a first angular position α. If a product container of a different diameter needs to be accommodated by product support and delivery system 100', bail cap 104 is reversed such that end portion 303 (designated B) is secured to trunion 116 to establish a second angular position β. In this particular manner, an offset or asymmetrical positioning of notches 186 and 187 determines the particular angular position, i.e., α or β, of bail cap 300 with respect to oscillator 102.

Based on the above, it should be understood that the product support and delivery system of the present invention provides a flexible arrangement enabling the vending machine to accommodate various size product containers without requiring substantial realignment or modification. In addition, the oscillator of the present invention actually supports the product containers in three dimensions so that a more accurate dispensing control can be realized, including minimizing the drop height of vended product containers. Although described with reference to preferred embodiments of the present invention, it should be readily apparent to one of ordinary skill in the art that various changes and/or modifications can be made to the invention without departing from the spirit thereof. For instance, while oscillator 102 has been described as rotating counterclockwise through the various bend angles, oscillator 102 could be rotated in either direction. In general, the invention is only intended to be limited to the scope of the following claims.

We claim:

1. A vending machine comprising:
   a cabinet frame including top, bottom, side and rear walls that collectively define a central cavity;
   a plurality of column walls defining a plurality of stack areas for storing product containers;
   a door pivotally mounted to the cabinet frame, said door being adapted to selectively close the central cavity;
   an oscillator pivotally mounted at a lower portion of one of the plurality of stack areas, said oscillator including a frame defining a product retention zone, said product retention zone including first and second staging regions, with each of said first and second staging regions incorporating upper and lower holding elements, wherein the first staging region retains a first product container and the second staging region simultaneously retains a second product container behind the first product container for subsequent vending operations; and
   a bail cap attached to the oscillator, said bail cap including an intermediate portion adapted to selectively support product containers in said one of the plurality of stack areas, said bail cap being adjustable relative to the oscillator in order to accommodate product containers of varying sizes in the product retention zone,
   wherein the oscillator frame includes top, bottom and opposing end plates, said bail cap being attached to the oscillator along the opposing end plates,
   wherein the bottom plate includes a plurality of stepped notches in each of the first and second staging regions, and
   wherein the plurality of stepped notches comprise terraced lands extending from the bottom plate.

2. The vending machine according to claim 1, wherein the bail cap is rotatably attached to the oscillator.

3. The vending machine according to claim 2, wherein the intermediate portion of the bail cap is arcuate in cross-section.

4. The vending machine according to claim 3, wherein the bail cap includes an adjusting element for selectively positioning the bail cap relative to the oscillator, the plurality of notches adapted to receive the adjusting element.

5. The vending machine according to claim 4, wherein the adjusting element includes a sliding mechanism having first and second end stops, each of said first and second end stops being adapted to selectively seat within one of the plurality of notches to establish a desired angular position of the bail cap relative to the oscillator.

6. The vending machine according to claim 3, wherein the intermediate portion is asymmetrical so that mounting the bail cap to the oscillator in a first orientation establishes a first angular position of the bail cap relative to the oscillator, and mounting the bail cap to the oscillator in a second orientation establishes a second angular position of the bail cap relative to the oscillator, wherein the first and second angular positions correspond to particular product container sizes.

7. A vending machine comprising:
   a cabinet frame including top, bottom, side and rear walls that collectively define a central cavity;
   a plurality of column walls defining a plurality of stack areas for storing product containers;
   a door pivotally mounted to the cabinet frame, said door being adapted to selectively close the central cavity;
   an oscillator pivotally mounted at a lower portion of one of the plurality of stack areas, said oscillator including a frame defining a product retention zone, said product retention zone including first and second staging regions, with each of said first and second staging regions incorporating upper and lower holding elements, wherein the first staging region is offset from the second staging region, wherein the first staging region retains a first product container and the second staging region simultaneously retains a second product container behind the first product container for subsequent vending operations; and
   a bail cap attached to the oscillator, said bail cap including an intermediate portion adapted to selectively support product containers in said one of the plurality of stack areas, said bail cap being adjustable relative to the oscillator in order to accommodate product containers of varying sizes in the product retention zone,
   wherein the oscillator frame includes top, bottom and opposing end plates, said bail cap being attached to the oscillator along the opposing end plates,
   wherein the bottom plate includes a plurality of stepped notches in each of the first and second staging regions, and
   wherein the plurality of stepped notches comprise terraced lands extending from the bottom plate.

8. The vending machine according to claim 7, wherein the bail cap is rotatably attached to the oscillator.

9. The vending machine according to claim 8, wherein the intermediate portion of the bail cap is arcuate in cross-section.

10. The vending machine according to claim 7, wherein the bail cap includes an adjusting element for selectively positioning the bail cap relative to the oscillator.

11. The vending machine according to claim 10, wherein the plurality of notches are adapted to receive the adjusting element.

12. The vending machine according to claim 11, wherein the adjusting element includes a sliding mechanism having first and second end stops, each of said first and second end stops being adapted to selectively seat within one of the plurality of notches to establish a desired angular position of the bail cap relative to the oscillator.

13. The vending machine according to claim 7, wherein the intermediate portion is asymmetrical so that mounting the bail cap to the oscillator in a first orientation establishes a first angular position of the bail cap relative to the oscillator, and mounting the bail cap to the oscillator in a second orientation establishes a second angular position of the bail cap relative to the oscillator, wherein the first and second angular positions correspond to particular product container sizes.

14. The vending machine according to claim 13, wherein said bail cap includes first and second end portions extending from the intermediate portion, said first and second end portions being snap-fittingly attached to the oscillator.

15. A vending machine comprising:
    a cabinet frame including top, bottom, side and rear walls that collectively define a central cavity;
    a plurality of column walls defining a plurality of stack areas for storing product containers;
    a door pivotally mounted to the cabinet frame, said door being adapted to selectively close the central cavity;
    an oscillator pivotally mounted at a lower portion of one of the plurality of stack areas, said oscillator including a frame defining a product retention zone, said product retention zone including first and second staging regions, with each of said first and second staging regions incorporating upper and lower holding elements, wherein the first staging region retains a first product container and the second staging region simultaneously retains a second product container behind the first product container for subsequent vending operations; and a bail cap attached to the oscillator, said bail cap including an intermediate portion adapted to selectively support product containers in said one of the plurality of stack areas, wherein the oscillator frame includes top, bottom and opposing end plates, said bail cap being attached to the oscillator along the opposing end plates, wherein the bottom plate includes a plurality of stepped notches in each of the first and second staging regions, and wherein the plurality of stepped notches comprise terraced lands extending from the bottom plate.

16. The vending machine according to claim 15, wherein the first staging region is offset from the second staging region.

17. The vending machine according to claim 15, further comprising:
 a sliding adjuster element provided on the bail cap to move a stop member from a first position to a second position.

18. The vending machine according to claim 17, said first and second positions defining different angular orientations of the bail cap relative to the oscillator.

19. The vending machine according to claim 18, wherein the bail cap is rotated relative to the oscillator by shifting the sliding adjuster element.

20. The vending machine according to claim 15, further comprising: an angled product delivery chute, said oscillator being spaced from the angled product delivery chute to define a vend height, wherein the terraced lands maintain a substantially constant vend height between the angled product delivery chute and the first and second staging regions.

21. The vending machine according to claim 15, wherein said oscillator is adapted to retain two product containers in each of the first and second staging regions.

* * * * *